(12) United States Patent
Dean et al.

(10) Patent No.: US 10,614,092 B2
(45) Date of Patent: Apr. 7, 2020

(54) OPTIMIZING DATA RETRIEVAL OPERATION IN BIG-DATA PROCESSING SYSTEMS

(71) Applicant: International Business Machines Corporation, Armonk, NY (US)

(72) Inventors: Daniel J. Dean, Yorktown Heights, NY (US); Alexei A. Karve, Mohegan Lake, NY (US); Hui Lei, Scarsdale, NY (US); Anca Sailer, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 337 days.

(21) Appl. No.: 15/413,706

(22) Filed: Jan. 24, 2017

(65) Prior Publication Data
US 2018/0210932 A1  Jul. 26, 2018

(51) Int. Cl.
*G06F 16/00* (2019.01)
*G06F 16/25* (2019.01)
(Continued)

(52) U.S. Cl.
CPC .............. *G06F 16/254* (2019.01); *G06F 3/06* (2013.01); *G06F 16/24* (2019.01); *G06F 16/252* (2019.01)

(58) Field of Classification Search
CPC ...... G06F 16/254; G06F 16/24; G06F 16/252; G06F 3/06; G06F 16/2455; G06F 16/3344; G06F 16/328; G06F 16/248; G06F 16/9535; G06F 16/00; G06F 17/273; G06F 17/277; G06F 17/30; G06Q 50/01
See application file for complete search history.

(56) References Cited

U.S. PATENT DOCUMENTS

| 6,298,370 B1 * | 10/2001 | Tang .................... G06F 9/5044 718/100 |
| 7,113,936 B1 * | 9/2006 | Michel .................... H03M 7/30 |

(Continued)

OTHER PUBLICATIONS

"UPC Language Features", Berkeley UPC—Unified Parallel C, http://upc.lbl.gov/lang-overview.shtml, A joint project of LBNL and UC Berkeley, May 5, 2014, 3 pages.

(Continued)

*Primary Examiner* — Anh Ly
(74) *Attorney, Agent, or Firm* — Francis Lammes; Stephen J. Walder, Jr.; Robert C. Bunker (57) ABSTRACT

A mechanism is provided for implementing operation optimization. Responsive to a request to load data via a input/output (I/O) load operation, prior to loading the data, transformed data in a local memory is searched for a match to the requested data. Responsive to identifying transformed that matches the requested data, the transformed data in the local memory is used to fulfill the request. Responsive to failing to identify transformed data in the local memory that matches the requested data, untransformed data in the local memory is searched for a match to the requested data. Responsive to identifying untransformed data that matches the requested data, the untransformed data in the local memory is used to fulfill the request. Responsive to failing to identify untransformed data in the local memory that matches the requested data, the requested data may be loaded from the storage system via the I/O load operation.

16 Claims, 4 Drawing Sheets

(51) Int. Cl.
   *G06F 16/24* (2019.01)
   *G06F 3/06* (2006.01)

(56) References Cited

U.S. PATENT DOCUMENTS

| | | | | |
|---|---|---|---|---|
| 7,260,820 | B1* | 8/2007 | Waldspurger | G06F 9/545 709/203 |
| 7,406,464 | B2 | 7/2008 | Kasten et al. | |
| 7,890,537 | B2 | 2/2011 | Kasten et al. | |
| 7,996,615 | B2 | 8/2011 | Galchev et al. | |
| 8,103,764 | B2 | 1/2012 | Aviles | |
| 8,301,590 | B2 | 10/2012 | Kasten et al. | |
| 8,504,736 | B2 | 8/2013 | Thaler et al. | |
| 8,949,614 | B1* | 2/2015 | Jernigan, IV | H04L 67/1097 713/178 |
| 8,996,534 | B2 | 3/2015 | Kasten et al. | |
| 9,009,409 | B2 | 4/2015 | Galchev et al. | |
| 9,135,194 | B2 | 9/2015 | Freimuth et al. | |
| 9,306,870 | B1* | 4/2016 | Klein | H04L 29/06176 |
| 9,582,528 | B2 | 2/2017 | Furuhashi et al. | |
| 9,742,867 | B1 | 8/2017 | Cavalier | |
| 2006/0143428 | A1* | 6/2006 | Noda | G06F 7/785 712/10 |
| 2009/0094258 | A1* | 4/2009 | Chen | G06F 16/2456 707/E17.044 |
| 2009/0300642 | A1* | 12/2009 | Thaler | G06F 3/0611 718/105 |
| 2011/0219208 | A1* | 9/2011 | Asaad | G06F 15/76 712/12 |
| 2011/0320643 | A1* | 12/2011 | Brice, Jr. | G06F 11/349 710/20 |
| 2011/0321158 | A1* | 12/2011 | Craddock | G06F 9/45558 726/20 |
| 2012/0117341 | A1* | 5/2012 | Amit | G06F 16/116 711/159 |
| 2012/0185870 | A1 | 7/2012 | Freimuth et al. | |
| 2014/0040292 | A1 | 2/2014 | Basak et al. | |
| 2014/0123102 | A1* | 5/2014 | Tian | G06F 8/441 717/106 |
| 2014/0281115 | A1* | 9/2014 | Biswal | G06F 12/084 711/3 |
| 2014/0281362 | A1 | 9/2014 | Felch | |
| 2015/0169461 | A1 | 6/2015 | Kasten et al. | |
| 2015/0213109 | A1 | 7/2015 | Kassko et al. | |
| 2016/0085809 | A1 | 3/2016 | de Castro Alves et al. | |
| 2016/0119443 | A1 | 4/2016 | Susarla et al. | |
| 2016/0188419 | A1 | 6/2016 | Dagar et al. | |
| 2016/0239527 | A1* | 8/2016 | Jang | G06F 16/2228 |
| 2016/0253391 | A1 | 9/2016 | Burns | |
| 2016/0328488 | A1* | 11/2016 | Lytle | G06F 9/54 |
| 2017/0235298 | A1 | 8/2017 | Nixon et al. | |
| 2017/0293666 | A1 | 10/2017 | Ragavan et al. | |
| 2018/0300249 | A1 | 10/2018 | Lim et al. | |

OTHER PUBLICATIONS

Grishchenko, Alexey, "Distributed Systems Architecture", Spark Architecture, http://0x0fff.com/spark-architecture/, Oct. 27, 2015, 7 pages.

Infante, Alejandro, "Identifying caching opportunities, effortlessly", ACM, ICSE Companion'14, Companion Proceedings of the 36th International Conference on Software Engineering, Hyderabad, India, May 31, 2014-Jun. 7, 2014, pp. 730-732.

Marin, Gabriel et al., "MISMI: A Framework for Application Performance Diagnosis", IEEE, 2014 IEEE International Symposium on Performance Analysis of Systems and Software (ISPASS), Mar. 23-25, 2014, pp. 158-168.

Or, Andrew, "Understanding your Spark application through visualization", Databricks, https://databricks.com/blog/2015/06/22/understanding-your-spark-application-through-visualization.html, Jun. 22, 2015, 6 pages.

Ousterhout, Kay et al., "Sparrow: Distributed, Low Latency Scheduling", ACM, SOSP'13, Farmington, Pennsylvania, Nov. 3-6, 2013, 16 pages.

Xie, Jiong et al., "Improving MapReduce Performance through Data Placement in Heterogeneous Hadoop Clusters", IEEE, Proceedings of the 19th International Heterogeneity in Computing Workshops, Atlanta, Georgia, Apr. 19-23, 2010, 9 pages.

List of IBM Patents or Patent Applications Treated as Related, Dec. 11, 2017, 2 pages.

* cited by examiner

OPTIMIZING DATA RETRIEVAL OPERATION IN BIG-DATA PROCESSING SYSTEMS

BACKGROUND

The present application relates generally to an improved data processing apparatus and method and more specifically to mechanisms for efficient data retrieval in big-data processing systems.

Big data is a term for data sets that are so large or complex that traditional data processing applications are inadequate to deal with them. Challenges include analysis, capture, data curation, search, sharing, storage, transfer, visualization, querying, updating, and information privacy. The term "big data" often refers simply to the use of predictive analytics, user behavior analytics, or certain other advanced data analytics methods that extract value from data, and seldom to a particular size of data set.

Analysis of data sets may find new correlations to "spot business trends, prevent diseases, combat crime, and so on". Scientists, business executives, practitioners of medicine, advertising, and governments alike regularly meet difficulties with large data sets in areas including Internet search, finance, urban informatics, and business informatics. Scientists encounter limitations in e-Science work, including meteorology, genomics, connectomics, complex physics simulations, biology, and environmental research. Massive open online courses (MOOCs) also bring big-data challenges as the courses reuse the same data sets for the students projects.

Big-data processing systems analyze big-data sets at terabyte or even petabyte scale. Offline batch data processing is typically full power and full scale, tackling arbitrary time series fact use cases. While real-time stream processing is performed on the most current slice of data for data profiling to pick outliers, fraud transaction detections, security monitoring, etc., the toughest task however is to do fast (low latency) or real-time ad-hoc analytics on a complete big data set, which practically means that terabytes (or even more) of data has to be scanned within seconds. This is only possible when data is processed with high parallelism, such as that used in big-data processing systems.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for implementing operation optimization in the data processing system. The illustrative embodiment, prior to loading the data from the storage system, searches transformed data in a local memory to identify data that matches the requested data in response to a request from an application to load data from a storage system via a input/output (I/O) load operation. The illustrative embodiment uses the transformed data in the local memory to fulfill the request in response to identifying transformed data in the local memory that matches the requested data. The illustrative embodiment search untransformed data in the local memory to identify data that matches the requested data in response to failing to identify transformed data in the local memory that matches the requested data. The illustrative embodiment uses the untransformed data in the local memory to fulfill the request in response to identifying untransformed data in the local memory that matches the requested data. The illustrative embodiment loads the requested data from the storage system via the I/O load operation in response to failing to identify untransformed data in the local memory that matches the requested data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Modern big-data processing systems are designed for bio-statisticians who are not experts in system usage optimization. In order to avoid costly big-data input/output (I/O) processing operations, the big-data processing systems keep as much data in memory as possible. To do this, the big-data processing systems offer various features to users, e.g., allowing data be kept in memory. However, when loading additional datasets or transforming similar datasets, data already existing in memory is not typically considered by the regular user. This may lead to expensive, redundant I/O operations as data already existing in memory is loaded in to memory again. For example, loading a dataset and then loading that same dataset again causes I/O operations to occur both times despite the fact that the data is already loaded into memory. Prior attempts to solve such issues provide simple solutions focused on block level I/O optimization. However, these approaches lack visibility into the user application space ignoring a rich source of large I/O optimizations, thus missing significant potential for further I/O optimization.

The illustrative embodiments provide an operation optimization mechanism that, responsive to a request from an application to load data from a storage system via a input/output (I/O) load operation, prior to loading the requested data from the storage system, searches transformed data in a local memory to identify data that matches the requested data. If the operation optimization mechanism identifies transformed data in the local memory that matches the requested data, the operation optimization mechanism uses the transformed data in the local memory to fulfill the request. If the operation optimization mechanism fails to identify transformed data in the local memory that matches the requested data, the operation optimization mechanism searches untransformed data in the local memory to identify data that matches the requested data. If the operation optimization mechanism identifies untransformed data in the local memory that matches the requested data, the operation optimization mechanism uses the untransformed data in the local memory to fulfill the request. If the operation optimization mechanism fails to identify untransformed data in the local memory that matches the requested data, the operation optimization mechanism loads the requested data from the storage system via the I/O load operation.

In accordance with the illustrative embodiments, data in a local memory may be visible to the (a) threads and (b) processes on the virtual machines associated with the threads.

Additionally, the operation optimization mechanism may determine whether a portion of data in the local memory is being utilized by more than one application. If the operation optimization mechanism determines that the portion of data in the local memory is being utilized by more than one application, the operation optimization mechanism marks the portion of data such that the portion of data is persisted within the local memory for a longer time than unmarked portions of data.

In another embodiment, responsive to the operation optimization mechanism failing to identify untransformed data in the local memory that matches the requested data and prior to loading the requested data from the storage system, the operation optimization mechanism searches transformed data in a shared memory to identify data that matches the requested data. If the operation optimization mechanism identifies transformed data in the shared memory that matches the requested data, the operation optimization mechanism uses the transformed data in the shared memory to fulfill the request. If the operation optimization mechanism fails to identify transformed data in the shared memory that matches the requested data, the operation optimization mechanism searches untransformed data in the shared memory to identify data that matches the requested data. If the operation optimization mechanism identifies untransformed data in the shared memory that matches the requested data, the operation optimization mechanism uses the untransformed data in the shared memory to fulfill the request. If the operation optimization mechanism fails to identify untransformed data in the shared memory that matches the requested data, the operation optimization mechanism loads the requested data from the storage system via the I/O load operation.

In accordance with the illustrative embodiments, data in a shared memory block is visible to all threads sharing that block. These threads may be allocated to multiple processing systems within a host system and may access that block for the lifetime of the block. This is invaluable because shared memory allows for threads of different processing systems to communicate and share data between one another.

In order for this second embodiment to operate, the operation optimization mechanism may determine whether a portion of data in the local memory is being utilized by multiple processing systems each running an application, i.e. multiple threads, in the data processing system above a predetermined frequency threshold. If the operation optimization mechanism determines that the portion of data in the local memory is being utilized by multiple processing systems each running an application in the data processing system above the predetermined frequency threshold, the operation optimization mechanism moves the portion of data from the local memory to a shared memory, the shared memory being accessible by the multiple processing systems. Thus, the operation optimization mechanism is then able to redirect accesses to the portion of data to the shared memory.

Similarly, the operation optimization mechanism may determine whether a data stream is being utilized by multiple processing systems each running an application, i.e. multiple threads, in the data processing system. If the operation optimization mechanism determines that the data stream is being utilized by multiple processing systems each running an application in the data processing system, the operation optimization mechanism loads the data stream into a shared memory, the shared memory being accessible by the multiple processing systems. Thus, the operation optimization mechanism is then able to redirect accesses to the data stream to the shared memory. The operation optimization mechanism is able to identify the data stream to be utilized by the multiple processing systems by performing a static code analysis of each application running on each of the multiple processing systems to identify one or more data streams to be utilized and, responsive to two or more applications utilizing a same data stream, identify the data stream as the data stream to be utilized by the multiple processing systems.

In yet another embodiment, responsive to the operation optimization mechanism failing to identify untransformed data in the shared memory that matches the requested data and prior to loading the requested data from the storage system, the operation optimization mechanism searches transformed data in a global memory to identify data that matches the requested data. If the operation optimization mechanism identifies transformed data in the global memory that matches the requested data, the operation optimization mechanism uses the transformed data in the global memory to fulfill the request. If the operation optimization mechanism fails to identify transformed data in the global memory that matches the requested data, the operation optimization mechanism searches untransformed data in the global memory to identify data that matches the requested data. If the operation optimization mechanism identifies untransformed data in the global memory that matches the requested data, the operation optimization mechanism uses the untransformed data in the global memory to fulfill the request. If the operation optimization mechanism fails to identify untransformed data in the global memory that matches the requested data, the operation optimization mechanism loads the requested data from the storage system via the I/O load operation.

In accordance with the illustrative embodiments, data in a global memory may be visible (depending on the access control) to all threads within all blocks (including all virtual machines), and the duration of the global memory is independent of the lifecycle of virtual machine allocation and threads duration. An example of such global memory is network-attached storage (NAS), Cloud Databases, Apache Ignite, or the like.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a", "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
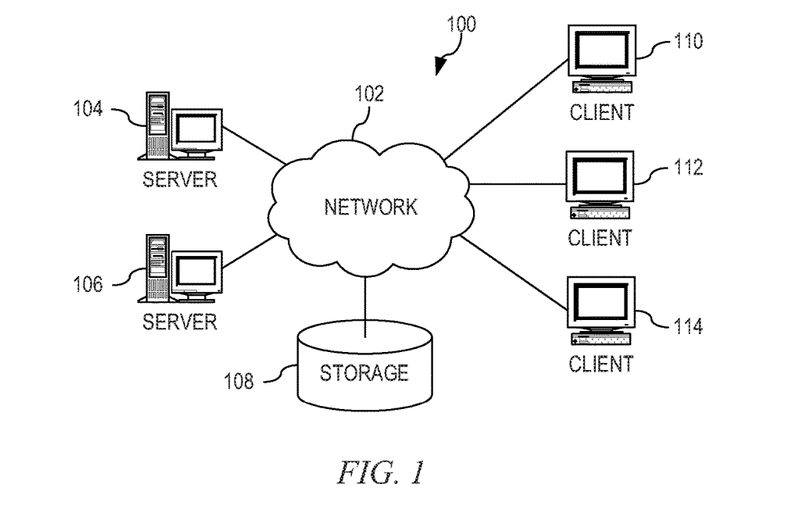
FIG. 1 is an example diagram of a distributed data processing system in which aspects of the illustrative embodiments may be implemented.
Figure 2:
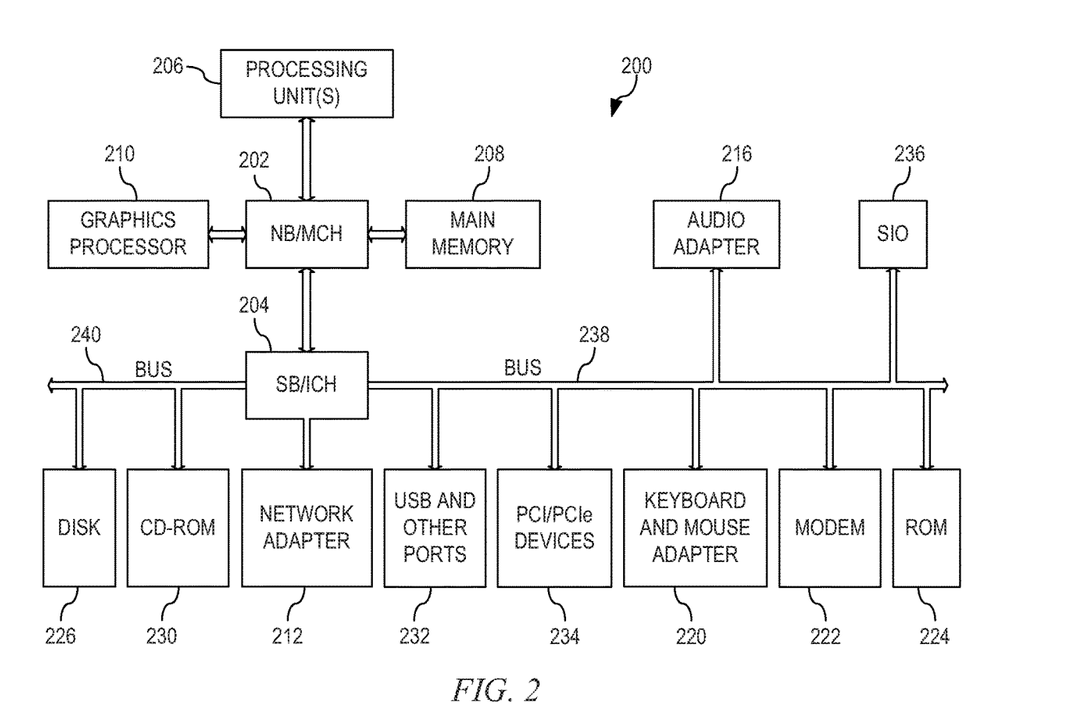
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an operation optimization mechanism optimizes I/O load operations. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates optimization of I/O load operations.

As noted above, the mechanisms of the illustrative embodiments utilize specifically configured computing devices, or data processing systems, to perform the operations for optimizing I/O load operations. These computing devices, or data processing systems, may comprise various hardware elements that are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (V/O) controller hub (SB/ICH) 204. Processing unit(s) 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit(s) 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit(s) 206. Alternatively, a single processor system may be employed.

Instructions and data for the operating system, the object-oriented programming system, and applications or programs are located on storage devices, such as HDD 226, and may be loaded into main memory 208 for execution by processing unit(s) 206. The processes for illustrative embodiments of the present invention may be performed by processing unit(s) 206 using computer usable program code and data, which may be located in a memory such as, for example, main memory 208, ROM 224, or in one or more peripheral devices 226 and 230, for example. Accordingly, main memory 208 may comprise one or more of local memory, shared memory, and global memory. Local memory comprises data that may be visible to the (a) threads and (b) processes on the virtual machines associated with the threads. Shared memory comprises data that may be visible to all threads sharing that block. These threads may be allocated to multiple processing systems within a host system and may access that block for the lifetime of the block. This is invaluable because shared memory allows for threads of different processing systems to communicate and share data between one another. Global memory comprises data that may be visible (depending on the access control) to all threads within all blocks (including all virtual machines), and the duration of the global memory is independent of the lifecycle of virtual machine allocation and threads duration. An example of such global memory is network-attached storage (NAS), Cloud Databases, Apache Ignite, or the like.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit(s) 206, or the like. As such, the computing device shown in FIG. 2 becomes specifically configured to implement the mechanisms of the illustrative embodiments and specifically configured to perform the operations and generate the outputs described hereafter with regard to the optimizing I/O load operations.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
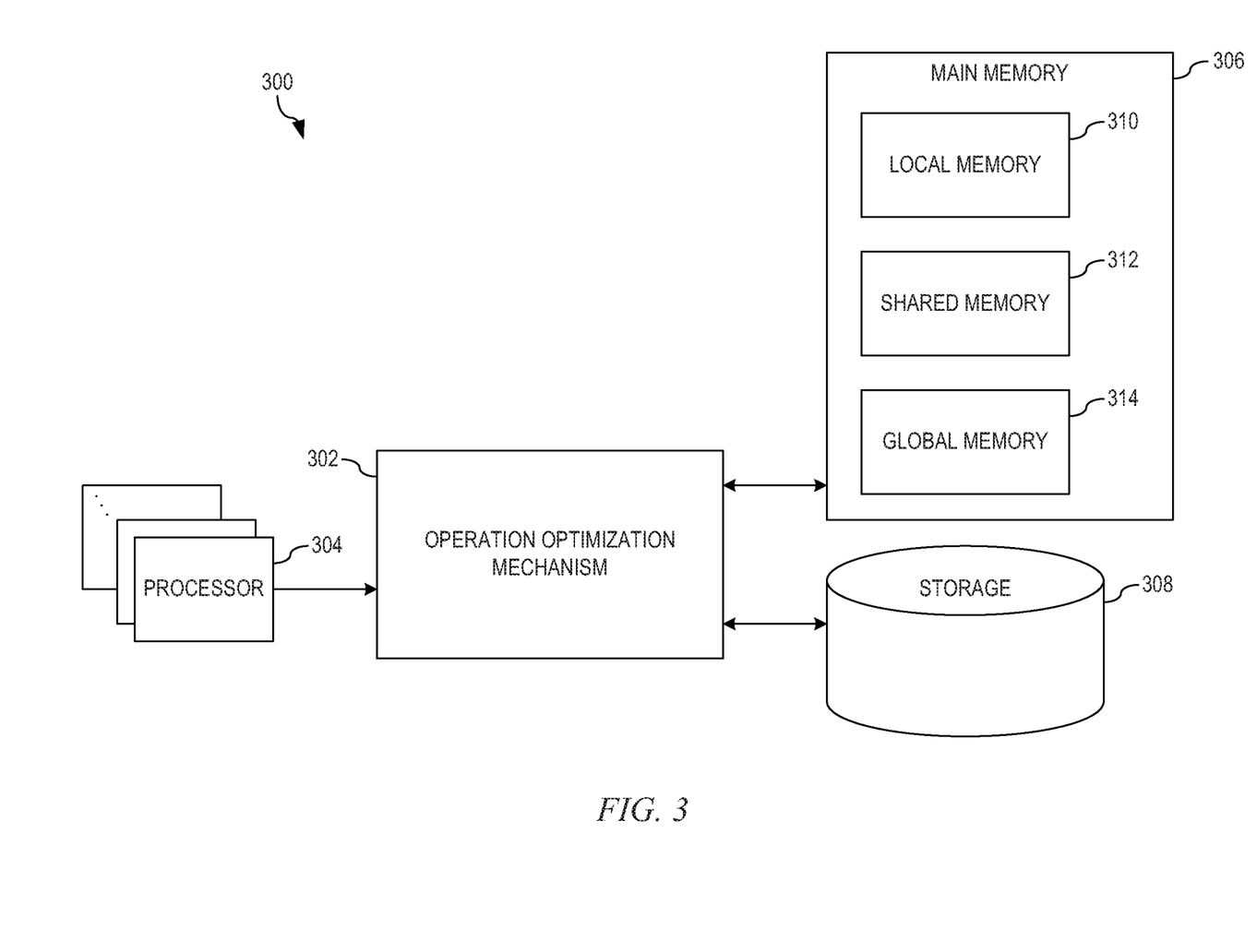
FIG. 3 depicts a functional block diagram of an operation optimization mechanism that optimizes I/O load operations in accordance with an illustrative embodiment.

FIG. 3 depicts a functional block diagram of an operation optimization mechanism that optimizes I/O load operations in accordance with an illustrative embodiment. Data processing system 300, which is a data processing system such as data processing system 200 of FIG. 2, comprises operation optimization mechanism 302, which is coupled to processors 304, main memory 306, and storage system 308. Main memory 306 further comprises local memory 310, shared memory 312, and global memory 314. In operation, operation optimization mechanism 302 receives a request from an application via one of processors 304 to load data from storage system 308 via an input/output (I/O) load operation. Prior to loading the requested data via the I/O load operation from storage system 308, operation optimization mechanism 302 searches transformed data in local memory 310 to identify data that matches the requested data. Transformed data is data that has already been loaded from storage system 308 into local memory 310 and has been changed by any operation performed by processors 304 for the application. That is, untransformed data was loaded via an I/O operation from storage system 308 to local memory 310 for use by the application and was changed to transformed data by processor 304 due to a requested operation by the application.

If operation optimization mechanism 302 identifies transformed data in local memory 310 that matches the requested data, operation optimization mechanism 302 uses the transformed data in local memory 310 to fulfill the request. If operation optimization mechanism 302 fails to identify transformed data in local memory 310 that matches the requested data, operation optimization mechanism 302 searches untransformed data in local memory 310 to identify data that matches the requested data. Untransformed data is data that has already been loaded from storage system 308 into local memory 310 but has not been changed by any operation performed by processors 304 for the application. That is, the untransformed data was loaded via an I/O operation from storage system 308 to local memory 310 for use by the application but the untransformed data was not changed by processor 304 due to a requested operation by the application.

If operation optimization mechanism 302 identifies untransformed data in local memory 310 that matches the requested data, operation optimization mechanism 302 uses the untransformed data in local memory 310 to fulfill the request. If operation optimization mechanism 302 fails to identify untransformed data in local memory 310 that matches the requested data, in one embodiment, operation optimization mechanism 302 may load the requested data from storage system 308 via the I/O load operation.

While data usually resides in local memory 310 only for the lifetime of the thread that requested the data or wrote to the data, in order to minimize I/O operations to storage system 308, operation optimization mechanism 302 may determine whether a portion of data in local memory 310 is being utilized by more than one application. If operation optimization mechanism 302 determines that the portion of data in local memory 310 is being utilized by more than one application, operation optimization mechanism 302 marks the portion of data such that the portion of data is persisted within local memory 310 for a longer time than unmarked portions of data in local memory 310.

In another embodiment, rather than loading the requested data from storage system 308 via the I/O load operation in response to failing to identify untransformed data in local memory 310 that matches the requested data, operation optimization mechanism 302 may, prior to loading the requested data from storage system 308, search transformed data in shared memory 312 to identify data that matches the requested data. Shared memory 312 comprises data that is visible to all threads within a block allocated to multiple ones of processors 304 and lasts for the duration of the block. For data to be located in shared memory 312, operation optimization mechanism 302 determines whether a portion of data in local memory 310 is being utilized by multiple one of processors 304 each running at least one application, i.e. multiple threads in a same block, in data processing system 300 above a predetermined frequency threshold. If operation optimization mechanism 302 determines that the portion of data in local memory 310 is being utilized by multiple ones of processors 304 each running at least one application in data processing system 300 above the predetermined frequency threshold, operation optimization mechanism 302 moves the portion of data from local memory 310 to shared memory 312, shared memory 312 being accessible by multiple ones of processors 304. Thus, operation optimization mechanism 302 is then able to redirect accesses to the portion of data to shared memory 312.

Similarly, operation optimization mechanism 302 may determine whether a data stream is being utilized by multiple ones of processors 304 each running at least one application, i.e. multiple threads, in data processing system 300. If operation optimization mechanism 302 determines that the data stream is being utilized by multiple ones of processors 304 each running at least one application in data processing system 300, operation optimization mechanism 302 loads the data stream into shared memory 312. Thus, operation optimization mechanism 302 is then able to redirect accesses from multiple ones of processors 304 to the data stream to shared memory 312. Operation optimization mechanism 302 is able to identify the data stream to be utilized by the multiple ones of processors 304 by performing a static code analysis of each application running on each of the multiple ones of processors 304 to identify one or more data streams to be utilized and, responsive to two or more applications utilizing a same data stream, identify the data stream as the data stream to be utilized by the multiple ones of processors 304.

Returning to the previous operation, if operation optimization mechanism 302 identifies transformed data in shared memory 312 that matches the requested data, operation optimization mechanism 302 uses the transformed data in shared memory 312 to fulfill the request. If operation optimization mechanism 302 fails to identify transformed data in shared memory 312 that matches the requested data, operation optimization mechanism 302 searches untransformed data in shared memory 312 to identify data that matches the requested data. If operation optimization mechanism 302 identifies untransformed data in shared memory 312 that matches the requested data, operation optimization mechanism 302 uses the untransformed data in shared memory 312 to fulfill the request. If operation optimization mechanism 302 fails to identify untransformed data in shared memory 312 that matches the requested data, in one embodiment, operation optimization mechanism 302 may load the requested data from storage system 308 via the I/O load operation.

In yet another embodiment, rather than loading the requested data from storage system 308 via the I/O load operation in response to failing to identify untransformed data in shared memory 312 that matches the requested data, operation optimization mechanism 302 may, prior to loading the requested data from storage system 308, search transformed data in global memory 314 to identify data that matches the requested data. Global memory 314 comprises data visible to all threads within all blocks associated with all of processors 304 of data processing system 300.

For data to be located in global memory 314, operation optimization mechanism 302 determines whether a portion of data in local memory 310 or shared memory 312 is being utilized across processors 304 each running at least one application, i.e. multiple threads in multiple blocks, in data processing system 300 above a predetermined frequency threshold. If operation optimization mechanism 302 determines that the portion of data in local memory 310 or shared memory 312 is being utilized across processors 304 each running at least one application in data processing system 300 above the predetermined frequency threshold, operation optimization mechanism 302 moves the portion of data from local memory 310 of shared memory 312 to global memory 314, global memory 314 being accessible by all of processors 304. Thus, operation optimization mechanism 302 is then able to redirect accesses to the portion of data to global memory 314.

If operation optimization mechanism 302 identifies transformed data in global memory 314 that matches the requested data, operation optimization mechanism 302 uses the transformed data in global memory 314 to fulfill the request. If operation optimization mechanism 302 fails to identify transformed data in global memory 314 that matches the requested data, operation optimization mechanism 302 searches untransformed data in global memory 314 to identify data that matches the requested data. If operation optimization mechanism 302 identifies untransformed data in global memory 314 that matches the requested data, operation optimization mechanism 302 uses the untransformed data in global memory 314 to fulfill the request. If operation optimization mechanism 302 fails to identify untransformed data in global memory 314 that matches the requested data, operation optimization mechanism 302 loads the requested data from storage system 308 via the I/O load operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4A:
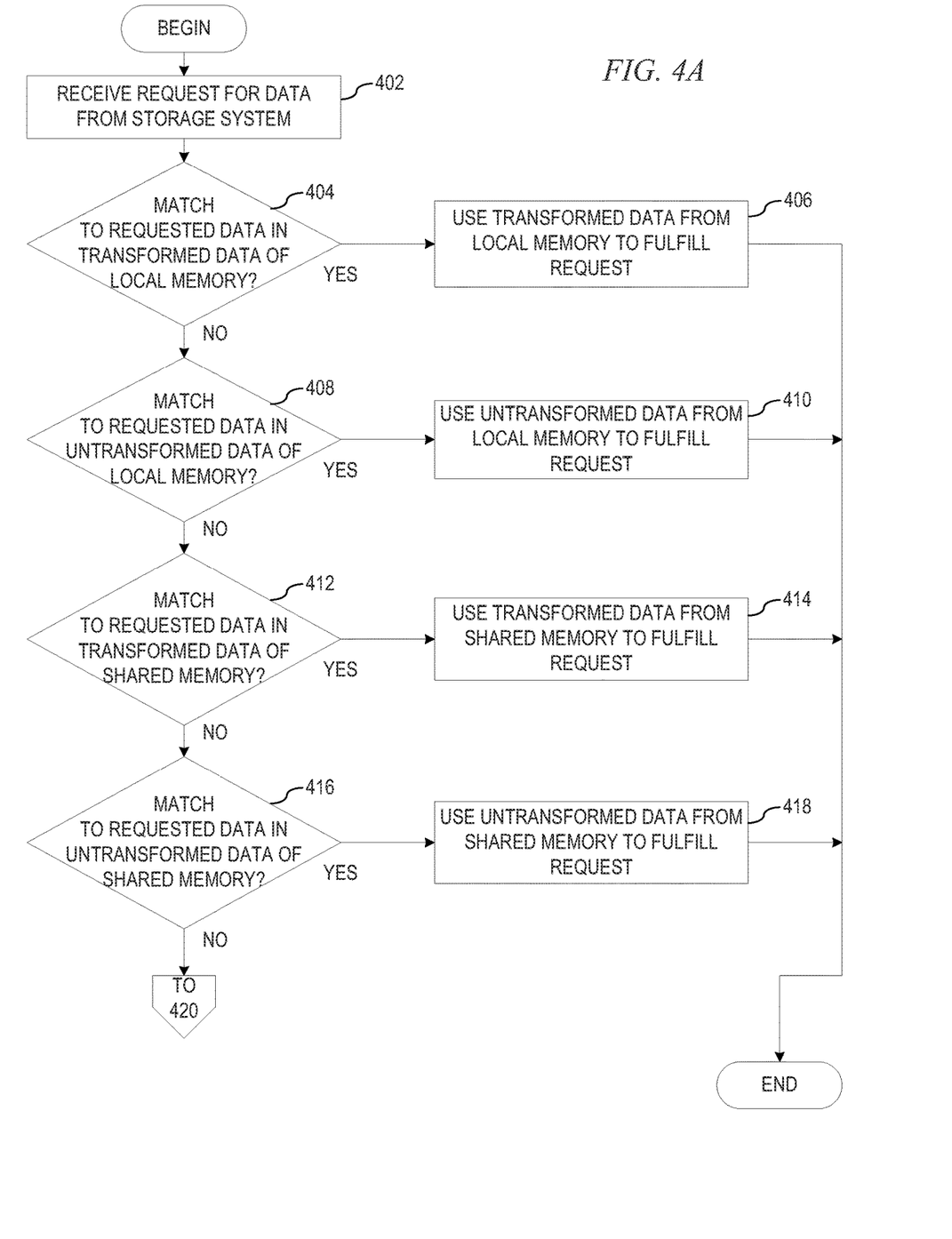
FIGS. 4A and 4B depict an exemplary flowchart of the operations performed by an operation optimization mechanism that optimizes I/O load operations in accordance with an illustrative embodiment.
Figure 4B:
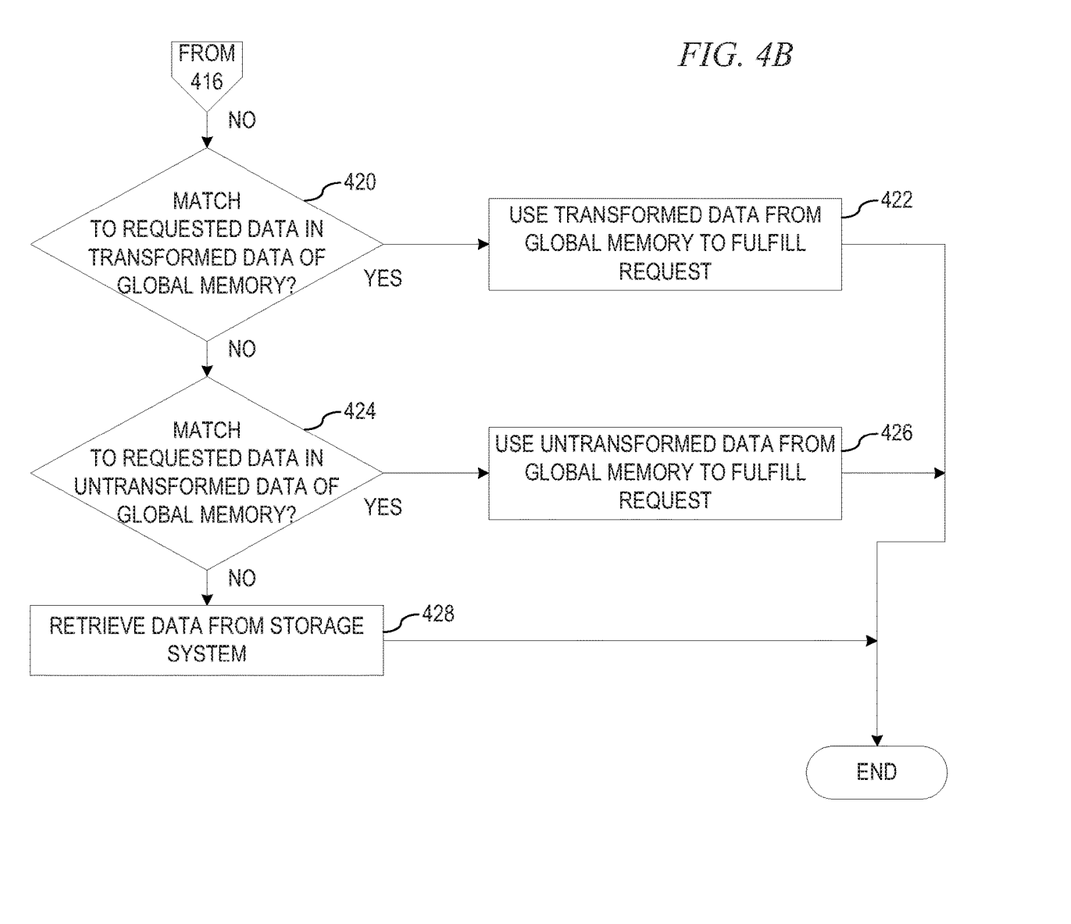

FIGS. 4A and 4B depict an exemplary flowchart of the operations performed by an operation optimization mechanism that optimizes I/O load operations in accordance with an illustrative embodiment. As the operation begins, the operation optimization mechanism receives a request from an application via a processor to load data from a storage system via an input/output (I/O) load operation (step 402). Prior to loading the requested data via the I/O load operation from the storage system, the operation optimization mechanism searches transformed data in the local memory to identify data that matches the requested data (step 404). If at step 404 the operation optimization mechanism identifies transformed data in local memory that matches the requested data, the operation optimization mechanism uses the transformed data in the local memory to fulfill the request (step 406), with the operation ending thereafter. If at step 404 the operation optimization mechanism fails to identify transformed data in the local memory that matches the requested data, the operation optimization mechanism searches untransformed data in the local memory to identify data that matches the requested data (step 408). If at step 408 the operation optimization mechanism identifies untransformed data in the local memory that matches the requested data, the operation optimization mechanism uses the untransformed data in the local memory to fulfill the request (step 410), with the operation ending thereafter.

If at step 408 the operation optimization mechanism fails to identify untransformed data in the local memory that matches the requested data, the operation optimization mechanism, prior to loading the requested data from the storage system, searches transformed data in the shared memory to identify data that matches the requested data (step 412). If at step 412 the operation optimization mechanism identifies transformed data in the shared memory that matches the requested data, the operation optimization mechanism uses the transformed data in the shared memory to fulfill the request (step 414), with the operation ending thereafter. If at step 412 the operation optimization mechanism fails to identify transformed data in the shared memory that matches the requested data, the operation optimization mechanism searches untransformed data in the shared memory to identify data that matches the requested data (step 416). If at step 416 the operation optimization mechanism identifies untransformed data in the shared memory that matches the requested data, the operation optimization mechanism uses the untransformed data in the shared memory to fulfill the request (step 418), with the operation ending thereafter.

If at step 416 the operation optimization mechanism fails to identify untransformed data in the shared memory that matches the requested data, the operation optimization mechanism, prior to loading the requested data from the storage system, searches transformed data in the global memory to identify data that matches the requested data (step 420). If at step 420 the operation optimization mechanism identifies transformed data in the global memory that matches the requested data, the operation optimization mechanism uses the transformed data in the global memory to fulfill the request (step 422), with the operation ending thereafter. If at step 420 the operation optimization mechanism fails to identify transformed data in the global memory that matches the requested data, the operation optimization mechanism searches untransformed data in the global memory to identify data that matches the requested data (step 424). If at step 424 the operation optimization mechanism identifies untransformed data in the global memory that matches the requested data, the operation optimization mechanism uses the untransformed data in the global memory to fulfill the request (step 426), with the operation ending thereafter. If at step 424 the operation optimization mechanism fails to identify untransformed data in the global memory that matches the requested data, the operation optimization mechanism loads the requested data from the storage system via the I/O load operation (step 428), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for an operation optimization mechanism that, responsive to a request from an application to load data from a storage system via a input/output (I/O) load operation, prior to loading the requested data from the storage system, searches for transformed data and then untransformed data in a local memory, shared memory, and global memory hierarchy to identify data that matches the requested data. If the operation optimization mechanism identifies transformed data or untransformed data in the local memory, shared memory, and global memory, hierarchy that matches the requested data, the operation optimization mechanism uses the transformed data/transformed data to fulfill the request. If the operation optimization mechanism fails to identify transformed data/untransformed data in the local memory, shared memory, and global memory, hierarchy that matches the requested data, only then does the operation optimization mechanism loads the requested data from the storage system via the I/O load operation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories that provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid-state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a non-transitory computer readable storage medium having a computer readable program for implementing data retrieval operation optimization stored therein, wherein the computer readable program, when executed on a computing device, causes the computing device to:
    responsive to a request from an application to load data from a storage system via a input/output (I/O) load operation, prior to loading the data from the storage system, search transformed data in a local memory to identify data that matches the requested data;
    responsive to identifying transformed data in the local memory that matches the requested data, use the transformed data in the local memory to fulfill the request;
    responsive to failing to identify transformed data in the local memory that matches the requested data, search untransformed data in the local memory to identify data that matches the requested data;
    responsive to identifying untransformed data in the local memory that matches the requested data, use the untransformed data in the local memory to fulfill the request; and
    responsive to failing to identify untransformed data in the local memory that matches the requested data, load the requested data from the storage system via the I/O load operation, wherein using the transformed data in the local memory to fulfill the request or, if the transformed data in the local memory that matches the requested data fails to exist, using the untransformed data in the local memory to fulfill the request, prior to loading the data from the storage system, optimizes the data retrieval operation.

2. The computer program product of claim 1, wherein the computer readable program further causes the computing device to:
    responsive to failing to identify untransformed data in the local memory that matches the requested data and prior to loading the requested data from the storage system via the I/O load operation, search transformed data in a shared memory to identify data that matches the requested data;
    responsive to identifying transformed data in the shared memory that matches the requested data, use the transformed data in the shared memory to fulfill the request;
    responsive to failing to identify transformed data in the shared memory that matches the requested data, search untransformed data in the shared memory to identify data that matches the requested data;

responsive to identifying untransformed data in the shared memory that matches the requested data, use the untransformed data in the shared memory to fulfill the request; and responsive to failing to identify untransformed data in the shared memory that matches the requested data, load the requested data from the storage system via the I/O load operation.

3. The computer program product of claim 2, wherein the computer readable program further causes the computing device to:

responsive to failing to identify untransformed data in the shared memory that matches the requested data and prior to loading the requested data from the storage system via the I/O load operation, search transformed data in a global memory to identify data that matches the requested data;

responsive to identifying transformed data in the global memory that matches the requested data, use the transformed data in the global memory to fulfill the request;

responsive to failing to identify transformed data in the global memory that matches the requested data, search untransformed data in the global memory to identify data that matches the requested data;

responsive to identifying untransformed data in the global memory that matches the requested data, use the untransformed data in the global memory to fulfill the request; and responsive to failing to identify untransformed data in the global memory that matches the requested data, load the requested data from the storage system via the I/O load operation.

4. The computer program product of claim 1, wherein the computer readable program further causes the computing device to:

responsive to a portion of data in the local memory being utilized by multiple processing systems within a same block each running an application in the data processing system above a predetermined frequency threshold, move the portion of data from the local memory to a shared memory, the shared memory being accessible by the multiple processing systems; and redirect accesses to the portion of data to the shared memory.

5. The computer program product of claim 1, wherein the computer readable program further causes the computing device to:

responsive to identifying a data stream to be utilized by multiple processing systems within a same block each running an application in the data processing system, load the data stream into a shared memory, the shared memory being accessible by the multiple processing systems; and redirect accesses to the data stream to the shared memory.

6. The computer program product of claim 1, wherein the computer readable program further causes the computing device to:

responsive to a portion of data in the local memory or a shared memory being utilized by multiple processing systems within a different blocks each running an application in the data processing system above a predetermined frequency threshold, move the portion of data from the local memory or the shared memory to a global memory, the global memory being accessible all the processing systems; and redirect accesses to the portion of data to the global memory.

7. The computer program product of claim 1, wherein the computer readable program further causes the computing device to:

responsive to a portion of data in the local memory being utilized by more than one application, mark the portion of data such that the portion of data is persisted within the local memory for a longer time than unmarked portions of data.

8. The computer program product of claim 7, wherein the computer readable program to identify the data stream to be utilized by the multiple processing systems further causes the computing device to:

perform a static code analysis of each application running on each of the multiple processing systems to identify one or more data streams to be utilized; and responsive to two or more applications utilizing a same data stream, identify the data stream as the data stream to be utilized by the multiple processing systems.

9. An apparatus for implementing operation optimization comprising:

a processor; and a memory coupled to the processor, wherein the memory comprises instructions which, when executed by the processor, cause the processor to:

responsive to a request from an application to load data from a storage system via a input/output (I/O) load operation, prior to loading the data from the storage system, search transformed data in a local memory to identify data that matches the requested data;

responsive to identifying transformed data in the local memory that matches the requested data, use the transformed data in the local memory to fulfill the request;

responsive to failing to identify transformed data in the local memory that matches the requested data, search untransformed data in the local memory to identify data that matches the requested data;

responsive to identifying untransformed data in the local memory that matches the requested data, use the untransformed data in the local memory to fulfill the request; and responsive to failing to identify untransformed data in the local memory that matches the requested data, load the requested data from the storage system via the I/O load operation, wherein using the transformed data in the local memory to fulfill the request or, if the transformed data in the local memory that matches the requested data fails to exist, using the untransformed data in the local memory to fulfill the request, prior to loading the data from the storage system, optimizes the data retrieval operation.

10. The apparatus of claim 9, wherein the instructions further cause the processor to:

responsive to failing to identify untransformed data in the local memory that matches the requested data and prior to loading the requested data from the storage system via the I/O load operation, search transformed data in a shared memory to identify data that matches the requested data;

responsive to identifying transformed data in the shared memory that matches the requested data, use the transformed data in the shared memory to fulfill the request;

responsive to failing to identify transformed data in the shared memory that matches the requested data, search untransformed data in the shared memory to identify data that matches the requested data;

responsive to identifying untransformed data in the shared memory that matches the requested data, use the untransformed data in the shared memory to fulfill the request; and responsive to failing to identify untransformed data in the shared memory that matches the requested data, load the requested data from the storage system via the I/O load operation.

11. The apparatus of claim 10, wherein the instructions further cause the processor to:

responsive to failing to identify untransformed data in the shared memory that matches the requested data and prior to loading the requested data from the storage system via the I/O load operation, search transformed data in a global memory to identify data that matches the requested data;

responsive to identifying transformed data in the global memory that matches the requested data, use the transformed data in the global memory to fulfill the request;

responsive to failing to identify transformed data in the global memory that matches the requested data, search untransformed data in the global memory to identify data that matches the requested data;

responsive to identifying untransformed data in the global memory that matches the requested data, use the untransformed data in the global memory to fulfill the request; and responsive to failing to identify untransformed data in the global memory that matches the requested data, load the requested data from the storage system via the I/O load operation.

12. The apparatus of claim 9, wherein the instructions further cause the processor to:

responsive to a portion of data in the local memory being utilized by multiple processing systems within a same block each running an application in the data processing system above a predetermined frequency threshold, move the portion of data from the local memory to a shared memory, the shared memory being accessible by the multiple processing systems; and redirect accesses to the portion of data to the shared memory.

13. The apparatus of claim 9, wherein the instructions further cause the processor to:

responsive to identifying a data stream to be utilized by multiple processing systems within a same block each running an application in the data processing system, load the data stream into a shared memory, the shared memory being accessible by the multiple processing systems; and redirect accesses to the data stream to the shared memory.

14. The apparatus of claim 9, wherein the instructions further cause the processor to:

responsive to a portion of data in the local memory or a shared memory being utilized by multiple processing systems within a different blocks each running an application in the data processing system above a predetermined frequency threshold, move the portion of data from the local memory or the shared memory to a global memory, the global memory being accessible all the processing systems; and redirect accesses to the portion of data to the global memory.

15. The apparatus of claim 9, wherein the instructions further cause the processor to:

responsive to a portion of data in the local memory being utilized by more than one application, mark the portion of data such that the portion of data is persisted within the local memory for a longer time than unmarked portions of data.

16. The apparatus of claim 15, wherein the instructions to identify the data stream to be utilized by the multiple processing systems further cause the processor to:

perform a static code analysis of each application running on each of the multiple processing systems to identify one or more data streams to be utilized;

responsive to two or more applications utilizing a same data stream, identify the data stream as the data stream to be utilized by the multiple processing systems.

* * * * *